Dec. 6, 1927.
R. C. MORGAN
1,651,614
GEAR CUTTING MACHINE
Filed Jan. 12, 1922    6 Sheets-Sheet 1
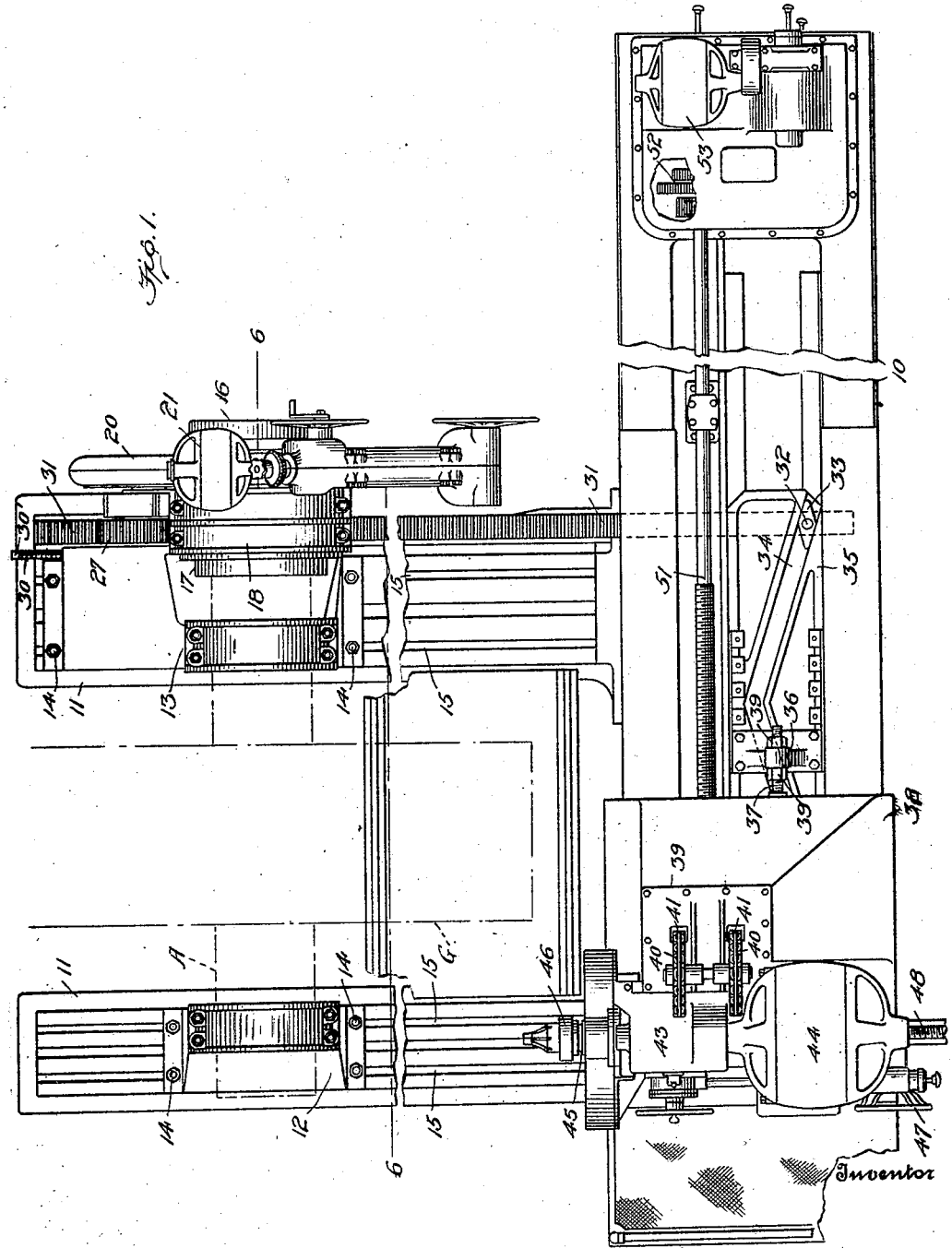

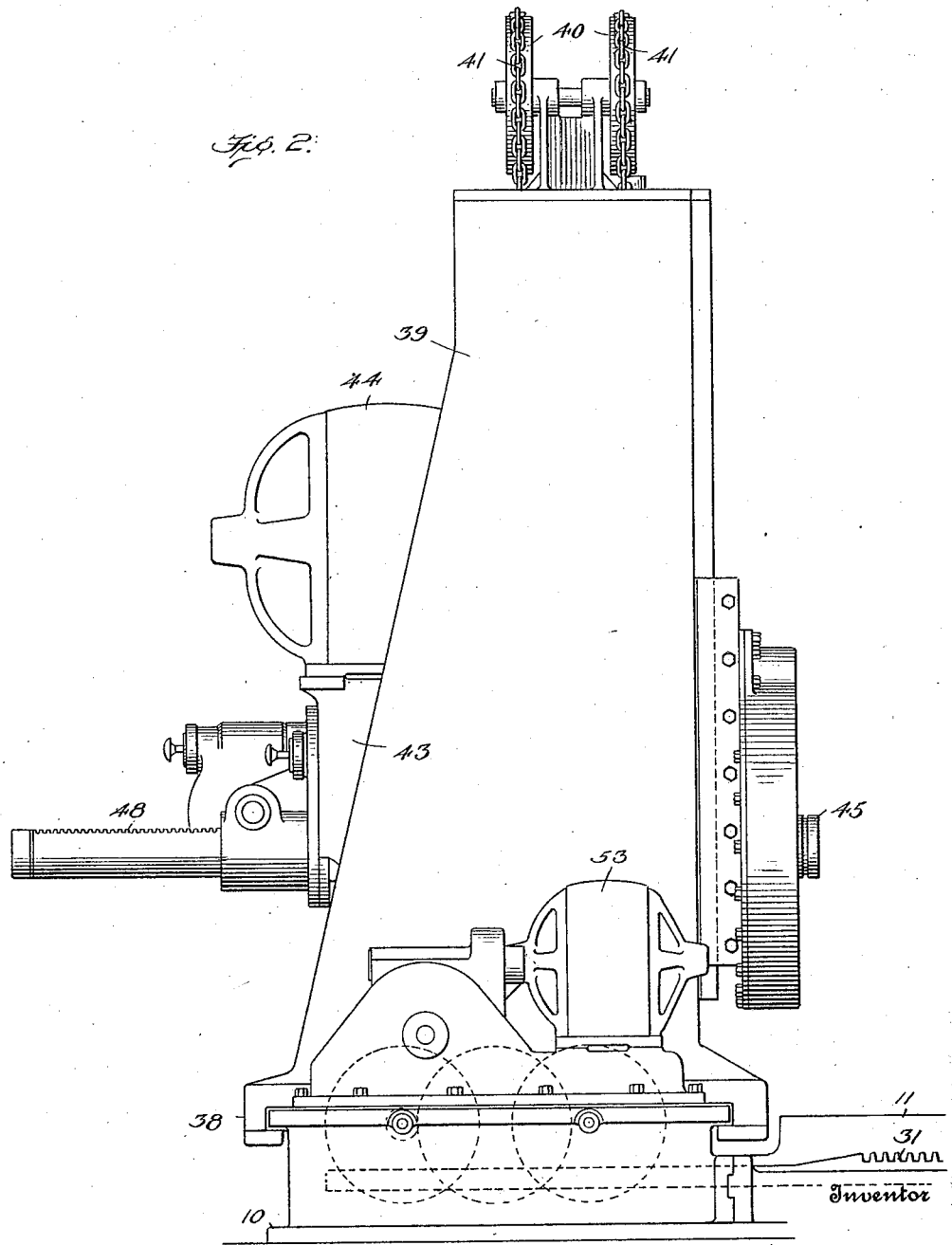

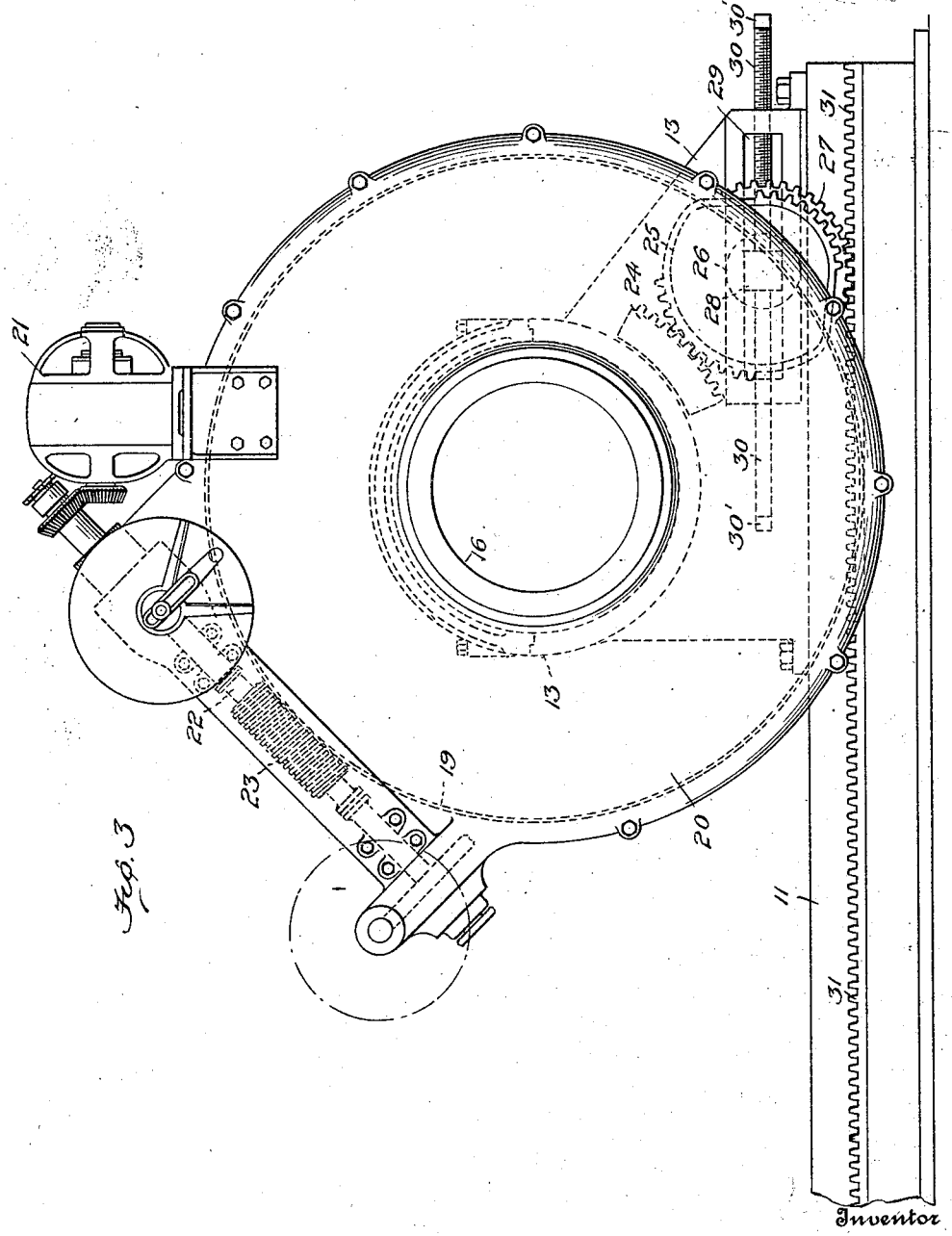

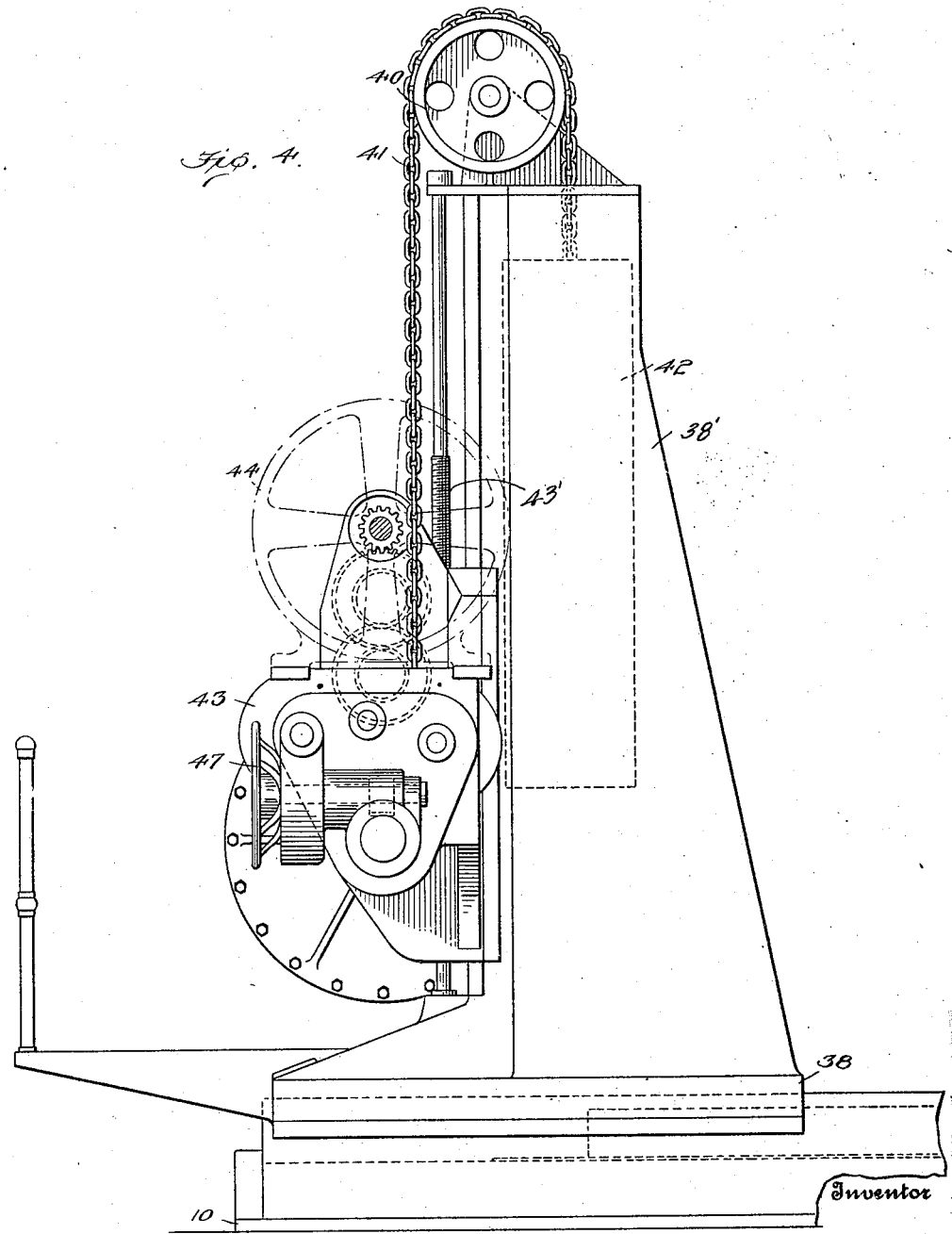

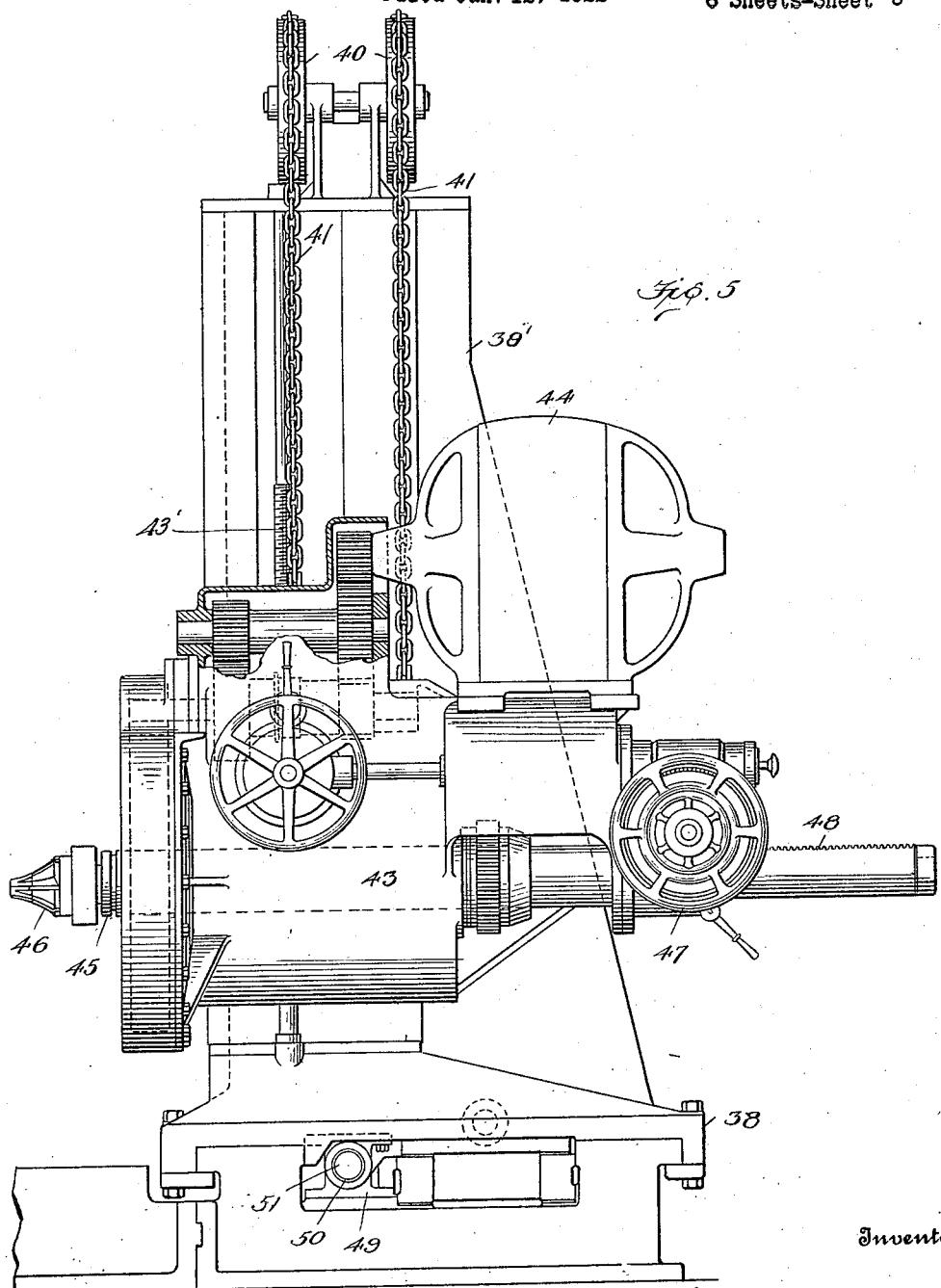

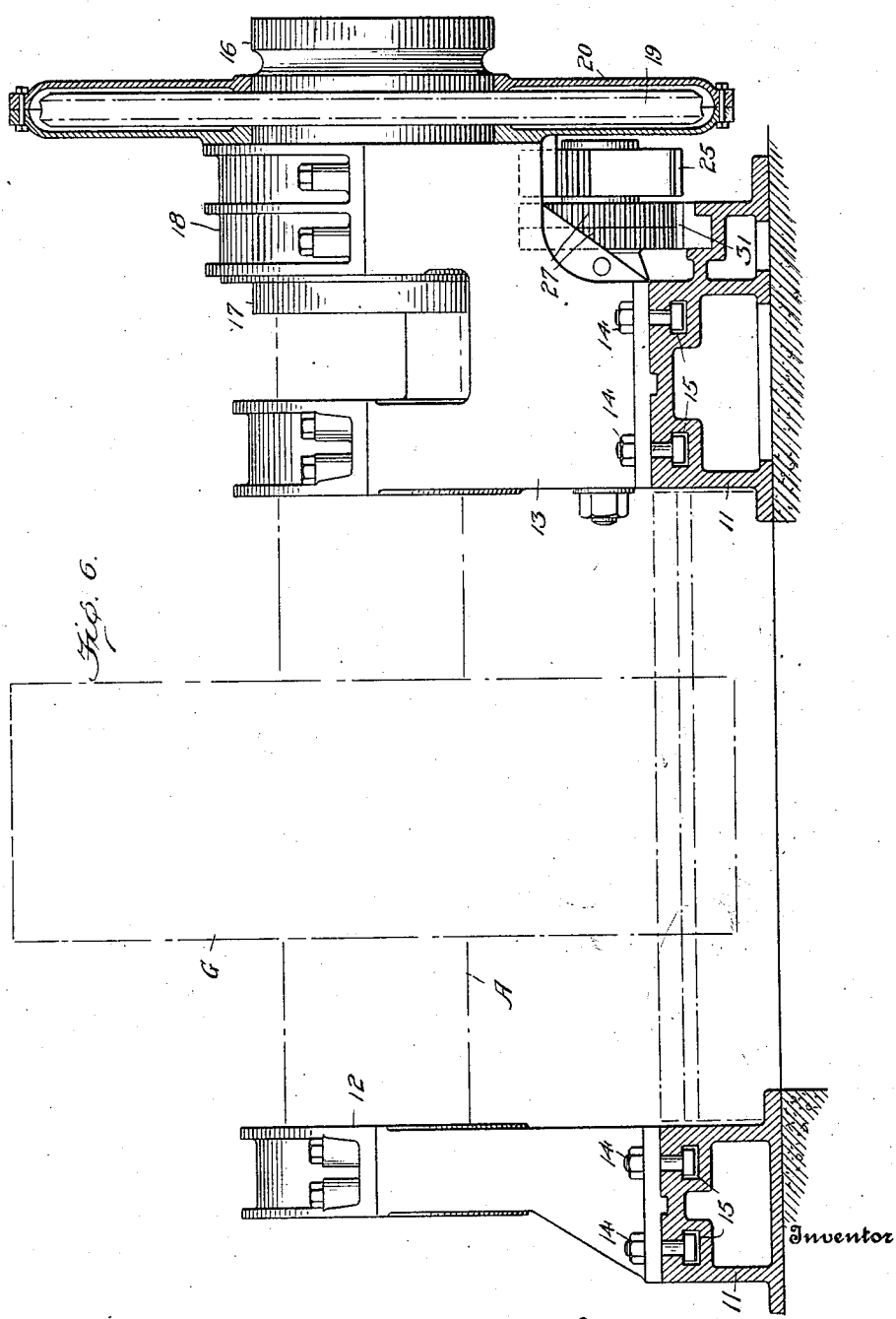

Patented Dec. 6, 1927.

1,651,614

UNITED STATES PATENT OFFICE.

REES C. MORGAN, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

GEAR-CUTTING MACHINE.

Application filed January 12, 1922. Serial No. 528,800.

This invention relates to gear cutting machines and particularly to machines of this class for cutting helical teeth, either single or double, on gear blanks of large size.

The object of the invention is to provide such a machine having novel means for effecting the rotation of the blank while the cutting is in progress, to secure an accurately formed helical tooth and which means is readily adjustable to permit the cutting of helical teeth having different slopes, or which make different angles with the axis of the blank. The invention also contemplates a novel means for preventing backlash or lost motion of the gear blank when double helical teeth are being cut and the angular motion of the blank is reversed when the cutter is at an intermediate point, generally the middle, of the groove being cut.

The principle of the invention may be embodied in various mechanisms and in the accompanying drawings one form is illustrated:

Fig. 1 is a plan view of the gear cutting machine;

Fig. 2 is an enlarged end elevation of portion of the machine;

Fig. 3 is a side elevation of the dividing head;

Fig. 4 is a front elevation of the travelling frame on which the cutting tool is mounted;

Fig. 5 is a side elevation of the same; and

Fig. 6 is a section on line 6—6 of Figure 1.

The bed of the machine is indicated at 10 and arranged at right angles to this bed are parallel tables or trackways 11 on which are supported the pedestals 12 and 13 which support the axle A of the gear blank G. The pedestals 12 and 13 are secured to the trackways 11 by bolts 14 the heads of which lie in T slots 15 of the trackways so that these pedestals may be moved longitudinally of the trackways in adjusting the machine to handle blanks of different diameters and firmly secured in any desired position. The right hand end of axle A (Figure 1) extends through the supporting pedestal 13 and enters and is secured in a sleeve 16 which in turn is mounted for rotation in a sleeve 17 revolubly supported in bearing 18. This bearing is supported from the base of pedestal 13. Sleeve 16 has fixed thereon a worm wheel 19 of a dividing head, and to sleeve 17 is fixed the casing 20 of the head.

Casing 20 has mounted thereon an electromotor 21 which is geared to a shaft 22 having a worm 23 thereon which meshes with the worm wheel 19. Operation of motor 21 effects relative rotation between the casing 20 and the worm wheel 19, and the advancement of the blank. The motor is energized after the cutting of each groove to advance the blank through one tooth interval.

Secured to casing 20 is a segment 24 which meshes with a change gear 25 which is keyed on a sleeve 26 integral and coaxial with the pinion gear 27. The pinion gear 27 is rotatably supported on a pin 28 which pin has a square shank slidably mounted in a horizontal slot 29 formed in the pedestal 13. Rods 30 having threaded engagement with apertures in pedestal 13 extend longitudinally through slot 29, the inner ends of these rods bearing on pin 28 and the outer ends being provided with squared portions 30' whereby they may be rotated. By longitudinally adjusting the rods the position of pin 28 may be changed and hence the axis of rotation of change gear 25. Pinion 27 meshes with a rack 31 supported for longitudinal movement in the trackway 11. Pinion 27 is formed in two preferably equal sections being, as shown in Figure 6, divided into halves along a plane at right angles to its axis. The two halves are adjustably secured together and by giving them a slight circumferential displacement, the effective width of the teeth may be increased to fit tightly in the interdental spaces of the rack 31 so that no lost motion occurs between the pinion and rack or, in other words, so that backlash is obviated.

Rack 31 extends under the bed 10 and has a pin 32 extending upwardly therefrom on which is mounted a diamond-shaped block 33. This block lies in a cam groove 34 formed in cam plate 35 which is slidable longitudinally of the bed 10 in suitable grooves. Opposite faces of block 33 bear against the opposite sides of the cam groove, as shown in Figure 1 and the cam groove is formed with two straight portions extending diagonally from the center of the plate at one side toward the corners at the other side, the angles of inclination of the two portions of the cam groove, relative to the axis of the blank G, being the same. The plate 35, as it is moved along bed 10, moves parallel to the axis of the blank G. The cam plate has an upwardly extending bracket 36 which is provided with a hole to receive a threaded stud 37 extending laterally from a frame 38 which is supported upon the bed 10 and also longitudinally slidable thereon. Nuts 39 threaded on stud 37 and on opposite sides of bracket 36 serve to prevent relative movement of the cam plate and frame 38 so that they move simultaneously longitudinally of the machine in its operation.

Supported on frame 38 is a hollow pedestal 38' upon the top of which are rotatably mounted two pulleys 40. Chains 41 pass over these pulleys and each has its respective lower ends connected to counterweight 42, located within the pedestal 38', and to the head 43, the arrangement being such that the head is vertically movable along a trackway formed in the side of the pedestal. The head 43 may be adjusted vertically by means of a screw 43'.

Head 43 supports a motor 44 which is operatively connected through suitable reducing gearing with a chuck or spindle 45 adapted to receive a milling cutter 46 of any desired form. As shown in Figure 1, the cutter 46 is in position to strike the edge of blank G if moved from left to right, and it can be seen that continued movement of the frame 38 will result in the cutter making a groove from one side of the blank to the other. The depth of groove can be regulated by means of a hand wheel 47 which operates a pinion in mesh with rack 48 by means of which the spindle 45 can be advanced toward or retracted from the work.

Bolted to the under side of the frame 38 is a member 49 having a threaded opening 50 therein through which the threaded shaft 51 extends, this shaft being rotatably supported in and extending longitudinally of the bed 10 and having one end connected through suitable reducing gear 52 with an electric motor 53. This motor is reversible and may be operated in either direction to effect the rotation of shaft 51 in either direction and hence the movement of the frame 38 and its associated cam plate 35 toward either end of the machine.

In the operation of the machine the gear blank G is first secured within the aligned bearings of pedestals 12 and 13, these pedestals being placed at the proper distance from the bed. The hand wheel 47 is operated to properly adjust the cutting tool 46 in relation to the blank, the motor 44 started, and then the motor 53. The cutter 46 is then rapidly revolving and the frame 38 and its associated cam plate 35 are moving from the left toward the right (Figure 1). Movement of the cam plate of course operates through the diamond-shaped block to cause movement of rack 31 which in turn rotates casing 20 by means of the pinion 27 and the change gear 25 and causes the slow rotation of the gear blank. The rotation of the blank is exactly proportional to the longitudinal movement of the cutter and causes the cut to be inclined or helical.

When the cutter reaches the center of the blank, the block 33 reaches the crest of cam slot 34 and further movement of the cam plate causes the blank to reverse its rotational movement which results in a groove being formed which is oppositely inclined on each side of its center, that is, a double helical groove is formed instead of a continuous helical groove. It is possible by altering the shape of the cam groove in the cam plate 35 and by changing the size of the particular change gear 25 employed to cut helical gears with teeth of widely different inclinations. Merely changing the gear 25 gives a large possible variation. It is necessary of course, with a change of gear radius, to change the center about which the gear rotates and this is easily accomplished by suitable adjustment of threaded rods 30.

By substituting for the cam plate 35 a plate having a straight inclined cam groove, a single helical tooth may be formed on the gear blank, and by forming this cam groove in still other and different ways it is possible to form teeth of various shapes on the gear blank. The cutter may be manipulated if desired, by the adjusting handwheels and by motor 53, to cut off the sharp crests or points of the gear teeth, which would tend to injure the teeth of a gear intermeshing therewith.

To one skilled in the art the advantages of the invention will be obvious, and it also will be apparent that the design and arrangement of the parts may be changed to a considerable extent without departing from the spirit of the invention.

Having thus described the invention, what is claimed as new and desired to be secured by Letters Patent is:

1. In a gear cutting machine, the combination of blank supporting means including an indexing wheel adapted for attachment to a blank, a casing for the indexing wheel, means carried by the casing for securing relative motion between the casing and the wheel, a gear member carried by the casing, gear mechanism meshing with said gear member, a rack movable transversely of the axis of the blank supporting means and meshing with said gear mechanism, a cutter head support movable in a path transversely of the face of a blank to be cut, and motion converting means between the cutter head support and said rack for converting each traverse movement of the cutter head support into a reciprocation of the rack, whereby said blank is rotated in a cycle comprising two consecutive steps, namely, partial rotation in one direction and partial rotation in the opposite direction.

2. In a gear cutting machine, the combination of means for holding a blank for rotation about a fixed axis, a sector carried by the blank holding means, a rack, a guideway, a shaft adjustable in the guideway, a gear carried by the shaft and meshing with the rack, a gear element carried by the shaft and meshing with the sector, a cutter head movable in a path transversely of the face of a blank to be cut, and means for transmitting motion from the cutter head to the rack.

3. In a gear cutting machine, the combination of blank holding means rotatable around a fixed axis, a sector carried by the blank holding means, a rack, a pinion meshing with the rack, means for adjusting the pinion longitudinally of the rack, a gear member detachably connected with respect to the pinion and meshing with the sector, a cutter head movable transversely of the face of the blank to be cut, and motion transmitting means between the cutter head and the rack.

In testimony whereof I hereunto affix my signature.

REES C. MORGAN.